(12) United States Patent
Mechin et al.

(10) Patent No.: US 6,574,395 B1
(45) Date of Patent: Jun. 3, 2003

(54) PHOTOWRITTEN BRAGG GRATING APODIZATION METHOD

(75) Inventors: David Mechin, Lannion (FR); Michel Nolf, Langoat (FR); Philippe Grosso, Lannion (FR)

(73) Assignee: SA Highwave Optical Technologies (FR)

( * ) Notice: Subject to any disclaimer, the term of this patent is extended or adjusted under 35 U.S.C. 154(b) by 0 days.

(21) Appl. No.: 09/620,895

(22) Filed: Jul. 21, 2000

(30) Foreign Application Priority Data

Jul. 21, 1999 (FR) .............................. 99 09443

(51) Int. Cl.[7] .............................................. G02B 6/34
(52) U.S. Cl. ........................................................ 385/37
(58) Field of Search ................................... 385/37, 123

(56) References Cited

U.S. PATENT DOCUMENTS 6,035,083 A * 3/2000 Brennan, III et al. ......... 385/37

FOREIGN PATENT DOCUMENTS

| EP | 0303836 | 4/1983 | ............ G02B/6/34 |
| EP | 0805365 A2 | 11/1997 | ............ G02B/6/16 |
| EP | 0893712 A2 | 1/1999 | ............ G02B/6/12 |
| EP | 0915354 A2 | 5/1999 | ............ G02B/6/34 |
| FR | 2764394 | 6/1997 | ............ G02B/6/34 |
| JP | 62071907 | 4/1987 | ............ G02B/6/34 |
| JP | 07098404 | 4/1995 | ............ G02B/5/18 |
| JP | 11133220 | * 5/1999 | |
| WO | WO 97/22023 | 6/1997 | ............ G02B/6/16 |
| WO | WO 98/12586 | 3/1998 | ............ G02B/6/16 |

* cited by examiner

*Primary Examiner*—Mark A. Robinson
*Assistant Examiner*—Alessandro V. Amari
(74) *Attorney, Agent, or Firm*—Blakely Sokoloff Taylor & Zafman

(57) ABSTRACT

The invention relates to an exposure method for producing a Bragg grating on a photosensitive guide (120) or optical fiber (120), in which method the guide (the fiber) (120) is scanned by a light beam (300) and means (100, 220, 230) are provided for modulating the exposure time along the guide (the fiber) by varying the speed at which the beam (300) moves along the guide (the fiber) (120) so that it is located opposite each location of the guide (the fiber) (120) for a time period that varies with the location, the method including the step of disposing in front of the guide (the fiber) (110) a system (140) adapted to create interference fringes on the guide (the fiber) (120) and to scan the beam (300) over the interference system (140) at a speed that is modulated along the system (140), and furthermore the step of having the beam scan the guide (the fiber) (120) at a modulated speed without the interference system (140) on the path of the beam (300), the scanning with the interference system (140) being effected with modulation of the exposure time increasing the exposure time in the central part of the guide (the fiber) (120) and the scanning without the interference system being effected with modulation of the exposure time reducing the exposure time in the central part of the guide (the fiber) (120).

15 Claims, 8 Drawing Sheets

PHOTOWRITTEN BRAGG GRATING APODIZATION METHOD

BACKGROUND

1. Field of the Invention

The invention concerns optoelectronics and more particularly the production of passive or active photowritten components for use in optical telecommunications networks.

2. Description of the Related Art

Photowriting is widely used in the production of Bragg gratings on optical fibers or on silica-on-silicon planar guides.

A grating of this kind is produced by varying the luminous energy transmitted per unit surface area (referred to as the "fluence") along the guide or the optical fiber.

In is often a question of creating interference fringes at a pitch $\Lambda$ at the level of and normal to the guide (or the core of the fiber in the case of an optical fiber). This modulation of the illumination generates at the level of the guide spatial modulation of the refractive index along the direction of propagation of light and it is this spatial modulation that forms the Bragg grating.

As shown in FIG. 3, in its routine use for propagation, the photowritten guide (or fiber core) reflects a wavelength referred to as the Bragg wavelength ($\lambda B$) whose value is given by the equation:

$$\lambda B = 2 \cdot N(\text{eff}) \cdot \Lambda$$

where $N(\text{eff})$ is the effective refractive index of the guide and $\Lambda$ is the pitch of the grating.

To obtain a Bragg grating, i.e. a modulated index grating, it is therefore necessary to expose the guide or the fiber to a UV beam modulated spatially along the guide.

Two interference systems are widely used to obtain spatial modulation of the UV beam, namely the phase mask and the Lloyd mirror. These systems are shown in figures 1 and 2.

Because the beam is narrow, the area of luminous interference formed by the exposure system is often shorter than the length required for the grating. This problem is solved by moving the combination of the guide and the interference system in front of the beam.

Photowriting a Bragg grating into silica doped with germanium leads to two phenomena that are relatively well known in the art, namely modulation of the index caused by the interference figure and an increase in the average index. These two effects are proportional, among other things, to the fluence of the UV exposure and the photosensitivity of the material.

Unfortunately, a constant amplitude of modulation like that shown in FIG. 4 leads to rejection and extinction spectra in the form of cardinal sinusoids (the Fourier transform of the modulation profile), with relatively large side lobes, which are undesirable, especially in Bragg gratings of wavelength division multiplex network components. FIG. 4b shows one such undesirable spectrum.

Generally speaking, a substantially Gaussian modulated refractive index profile and a constant average index are required, so that the reflection peak characteristic of the grating has the narrowest possible spectrum and no side lobes. Such modulation adaptation is referred to as "apodization".

To eliminate the side lobes it is known in the art to adopt a modulation profile (or envelope) that is substantially Gaussian and to retain a constant average index (see FIG. 6).

In the case of a Gaussian profile average index, as shown in FIG. 5, a Fabry-Pérot cavity can be created between the edges of the grating, which then have a shorter Bragg wavelength than that reflected at the center ($\lambda_B = 2\Lambda n_{\text{eff}}$), as shown in FIG. 5b. This phenomenon is reflected in the occurrence of unwanted side lobes at the shorter wavelengths, which disappear if the average index becomes uniform again along the grating.

The appendix refers to a series of publications relating to apodization techniques known in the art.

The solution adopted for fibers is to photowrite the Gaussian modulated part of the index on a face of the fiber referred to as the front face, through the phase mask, and simultaneously to correct the average index continuously, with the aim of rendering it constant, on a face referred to as the rear face.

The Gaussian envelopes of the modulated index and continuous correction are obtained as the fiber and the mask are moved in front of the beam by spatial variation of the intensity of the laser beam. As shown in FIG. 7, the variation is obtained by placing two additional mask D1 and D2 fastened to the fiber in front of each beam, the additional masks having a transmission ratio that varies with position on each mask.

The combination D1, D2, the phase mask and the fiber move in front of the two laser beams during photowriting and the index modulation envelope is given by the two distribution densities over D1 and D2.

The above technique applies only to optical fibers, because it is impossible to photowrite through silicon for a silica-on-silicon guide. However, it would be possible to produce the apodized grating in two passes, one with a mask D1 and the phase mask and then the other with the mask D2 without the phase mask. A major problem would remain, namely the non-coincidence of the densities over D1 and D2 during the two photowriting passes.

A second apodizing solution consists of using the phase mask and vibrating the fiber or the phase mask using a piezo-electric system, with a vibration amplitude varying from the edge to the center of the photowritten grating such that the average exposure at the edges is quasi-continuous and the fluence of the fringes falls off towards the center and is eliminated at the center.

The second technique can be applied to a silica-on-silicon guide because everything happens on the front face, but it is more difficult to vibrate a silicon wafer and vibrating the wafer entails the risk of breaking the adhesive bonds between a fiber and a guide, as usually encountered in silica guide assemblies.

In both cases the index distribution along the axis of the fiber is preferably apodized with the envelope shown in FIG. 6.

The document FR 2 764 394 proposes to add a rotary mask in the form of a helix in front of a phase mask to interrupt the beam intermittently as it rotates.

The rotary mask is also adapted to move transversely to the beam and the average ratio of masking of the beam is higher or lower according to the distance of the beam from the center of the rotary mask. A modulation of the fluences applied to each guide portion is chosen by varying the transverse position of the rotary mask relative to the beam during the movement of the guide in front of the beam.

SUMMARY

Although the above method gives satisfactory results, it is relatively complex to put into practice and the accuracy of the resulting apodization leaves room for improvement.

This improvement is the object of the invention, which proposes an apodization method that is easy to implement on a guide, in particular on a silica guide, and which is particularly precise.

The above object is achieved in accordance with the invention by an exposure method for producing a Bragg grating on a photosensitive guide or an optical fiber, in which method the guide (the fiber) is scanned by a light beam and means are provided for modulating the exposure time along the guide (the fiber) by varying the speed at which the beam moves along the guide (the fiber) so that it is located opposite each location of the guide (the fiber) for a time period that varies with the location, the method including the step of disposing in front of the guide (the fiber) a system adapted to create interference fringes on the guide (the fiber) and to scan the beam over the interference system at a speed that is modulated along the system, and furthermore the step of having the beam scan the guide (the fiber) at a modulated speed without the interference system on the path of the beam, the scanning with the interference system being effected with modulation of the exposure time increasing the exposure time in the central part of the guide (the fiber) and the scanning without the interference system being effected with modulation of the exposure time reducing the exposure time in the central part of the guide (the fiber).

BRIEF DESCRIPTION OF THE DRAWINGS

Other features, objects and advantages of the invention will become more apparent after reading the following detailed description, which refers to the accompanying drawings, in which:

FIG. 4b shows a reflection spectrum of an optical guide photowritten in accordance with the plot of FIG. 4;

FIG. 5b shows a reflection spectrum obtained with an index distribution conforming to that of FIG. 5;

FIG. 6b shows a reflection spectrum of a guide apodized according to the plot from FIG. 6;

DETAILED DESCRIPTION

Figure 1:
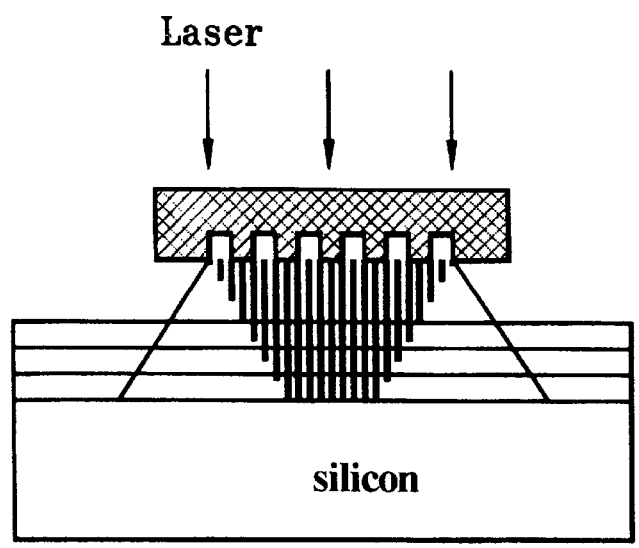
FIG. 1 shows a prior art phase mask system.
Figure 2:
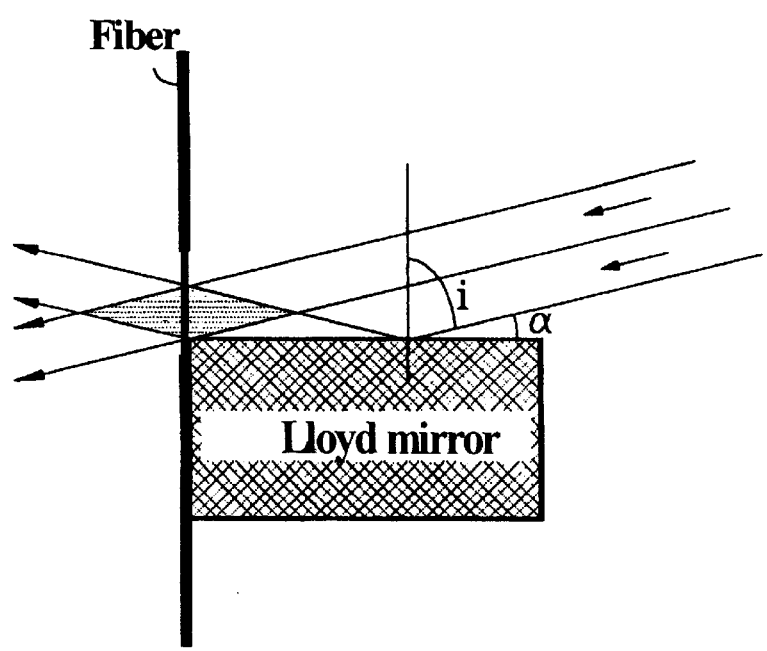
FIG. 2 shows a prior art Lloyd mirror system.
Figure 3:
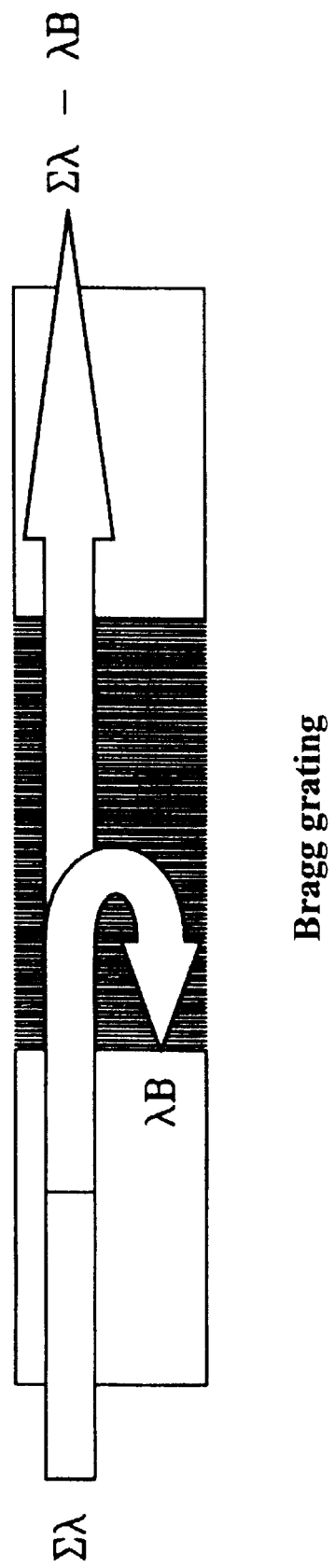
FIG. 3 shows a Bragg grating of a type known in the art.
Figure 4:
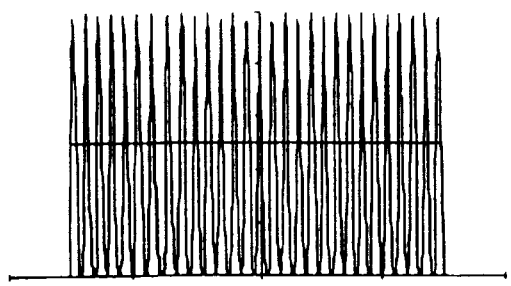
FIG. 4 shows a plot representative of a refractive index distribution along an optical guide with a constant average index.
Figure 4:
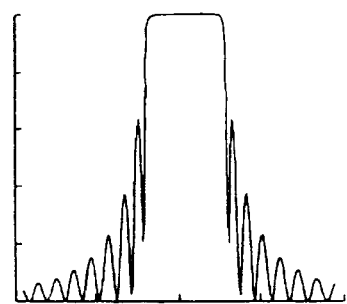
Figure 5:
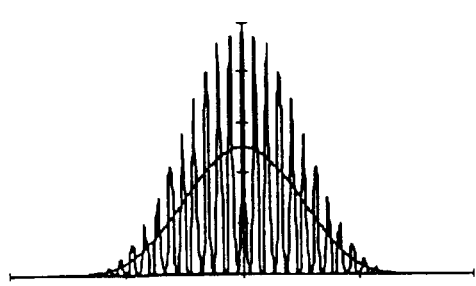
FIG. 5 shows an apodization plot with a Gaussian average index distribution.
Figure 5:
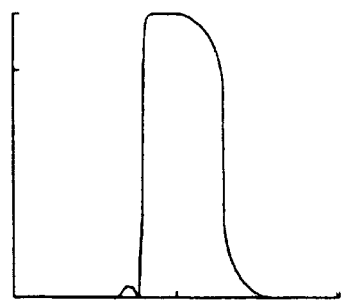
Figure 6:
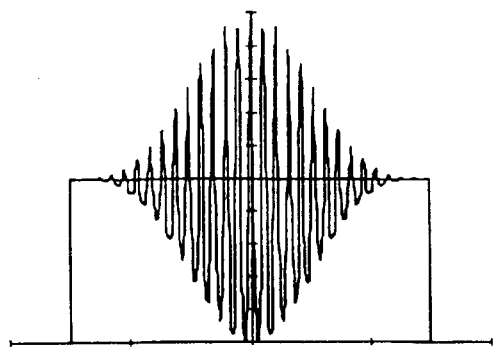
FIG. 6 shows an apodization plot with a Gaussian envelope and constant average index distribution.
Figure 6:
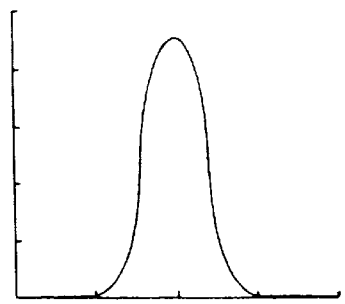
Figure 7:
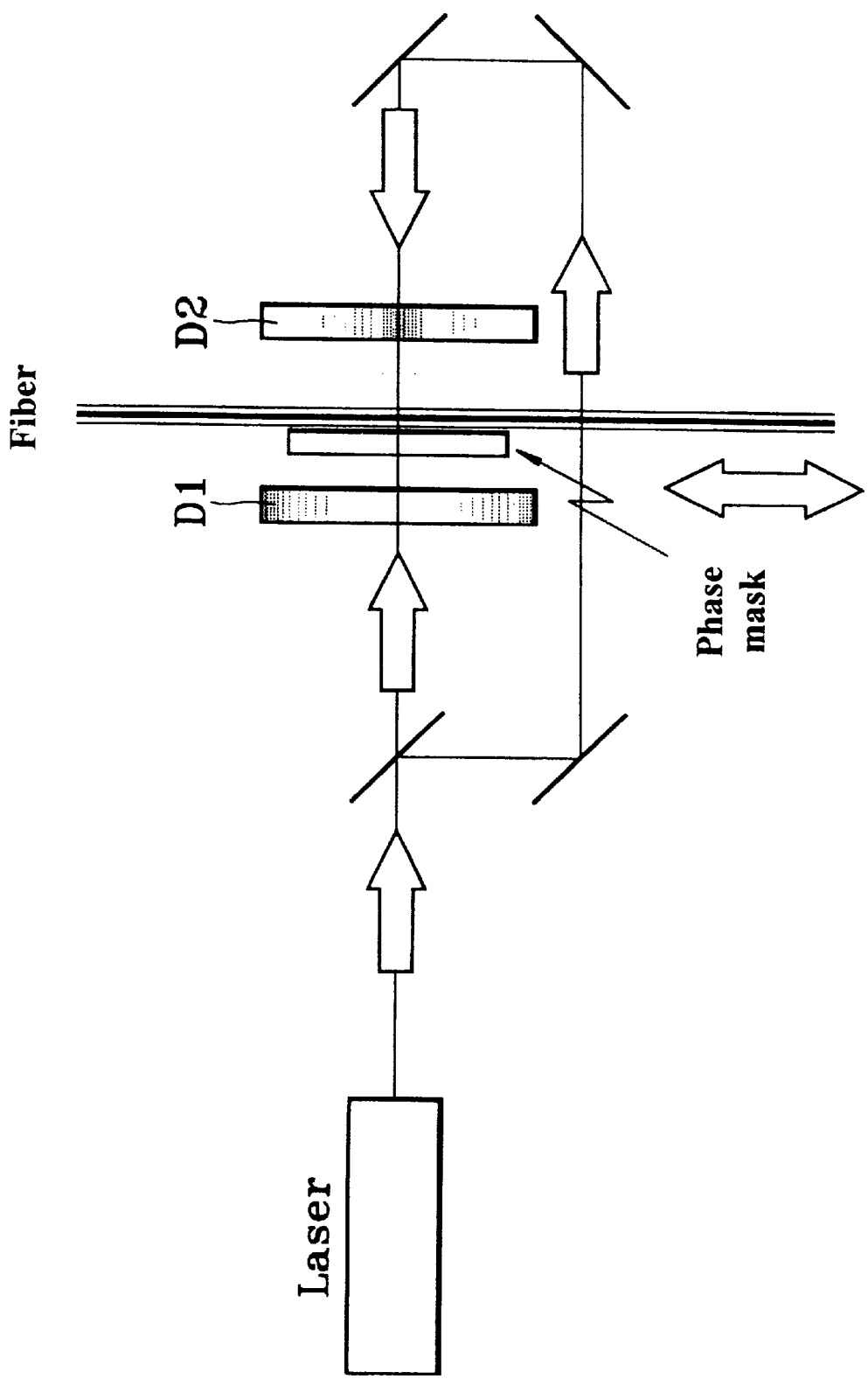
FIG. 7 shows a prior art apodization system using intensity masks.
Figure 8:
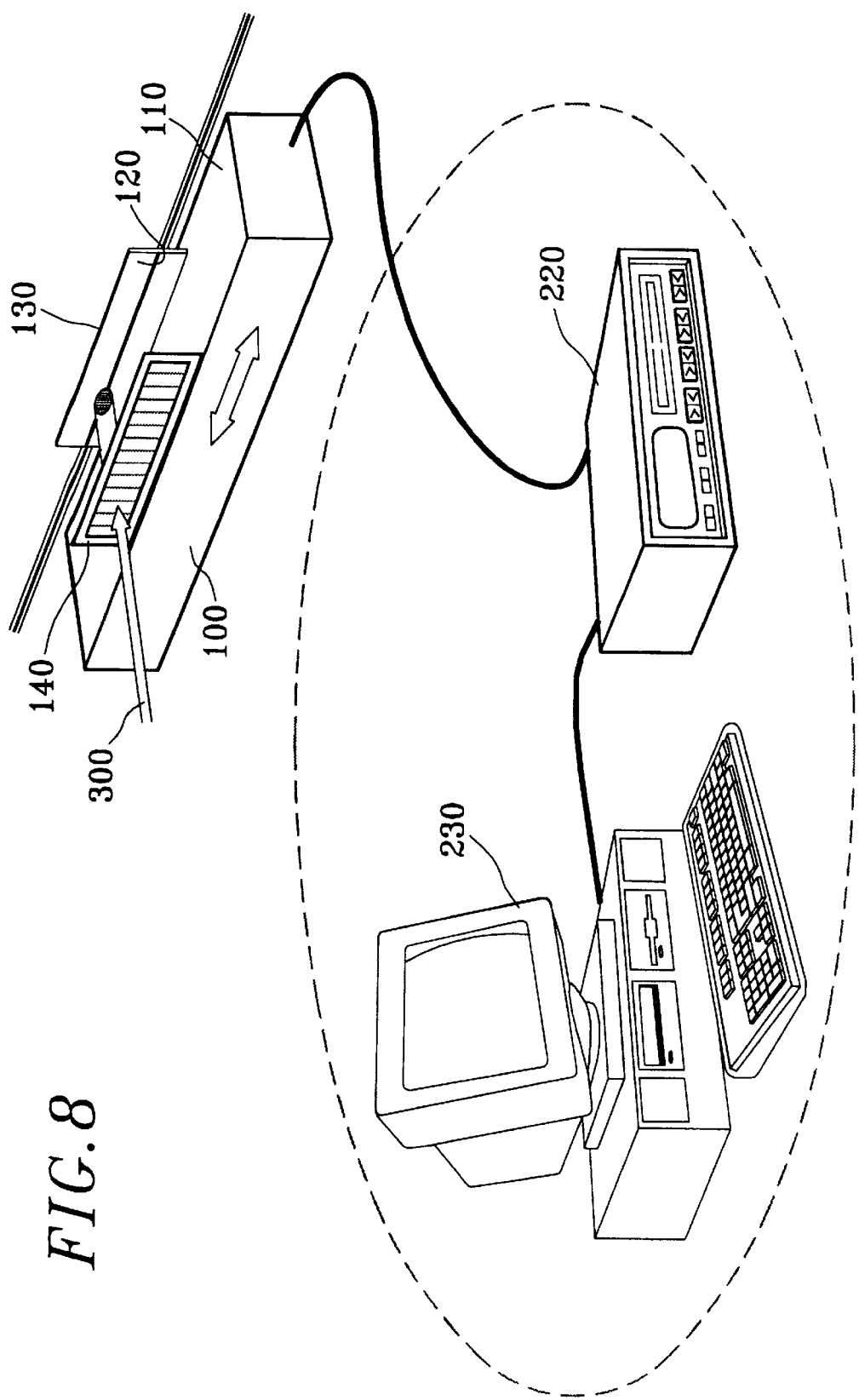
FIG. 8 shows an apodization system according to the invention.

The exposure system shown in FIG. 8 includes a translation motor 100 powered by an electrical generator 220 controlled by a computer 230. The motor 100 moves a top plate 110 carrying a system comprising a silica guide 120 fixed to a silicon wafer 130 and a phase mask 140. Due to the action of the mask 140, a fixed laser beam 300 laterally of the above combination forms fringes on the guide 120.

The computer 230 is programmed to cause the source 220 to generate electrical pulses adapted to move the plate 110 in stepwise translation with a particular waiting time between steps. The waiting time between steps is stored beforehand in the memory of the computer 230.

The refractive index at each location is proportional to the time for which the beam is immobile at that location. The computer calculates the immobility time for each step as a function of the required index distribution.

To be more precise, the computer 230 offers a user a menu listing various refractive index modulation curves. Once a modulation envelope curve has been chosen, the computer uses data controlling the motion of the carriage, i.e. a distribution of the beam waiting time for each step, in accordance with a prerecorded curve similar to that chosen by the user.

The apodization technique proposed is therefore not based on varying the intensity of the laser beam but instead varies the laser beam exposure time according to its position.

In this embodiment, the computer 230 commands two successive passes of the carriage 100 past the beam. A first pass is effected with the phase mask 140 in front of the guide 120. The second pass is effected without the mask 140. The two passes are effected in opposite directions to avoid the need for a carriage return between the two passes. During the first pass with the mask 140 the beam forms interference fringes on the guide in each step and in a restricted area aligned with the beam.

The mask 140 therefore forms fringes at the pitch of the Bragg grating whose exposure time is a function of their position on the guide, and the formation time of each fringe is modulated by the time for which the beam is present in front of it. Accordingly, by adopting for the beam a time of passage that varies according to a Gaussian type curve, like that shown in FIG. 9, a refractive index distribution is obtained like that shown in FIG. 10, i.e. an index distribution forming sinusoids whose amplitude varies in accordance with a Gaussian curve.

In other words, the interference fringes expose the guide for a time period that varies according to their position, the period depending on the speed at which the beam is moved.

Figure 9:
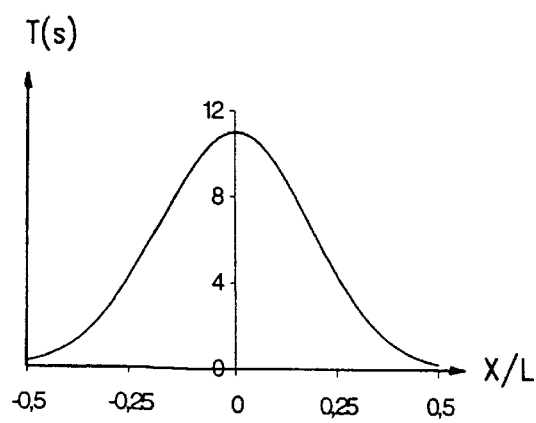
FIG. 9 shows an exposure time distribution along a guide obtained with a method according to the invention.
Figure 10:
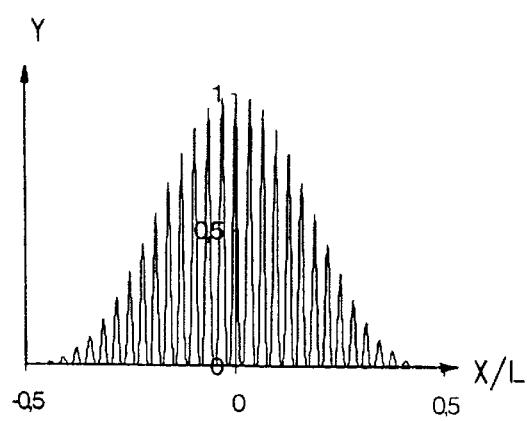
FIG. 10 shows a plot of the refractive index distribution after a first apodization step according to the invention.

The FIG. 9 curve shows the exposure time or the time the beam spends at each position as a function of that position along the guide. In other words, the ordinates of the curve are inversely proportional to those of a curve representing the average speed of the beam past each location concerned of the guide, the average speed at a given point of the guide being defined by the width of the beam divided by the time for which the beam is present at that point.

The second pass, without the mask, applies continuous correction, i.e. correction without interference fringes, to the refractive index.

Figure 11:
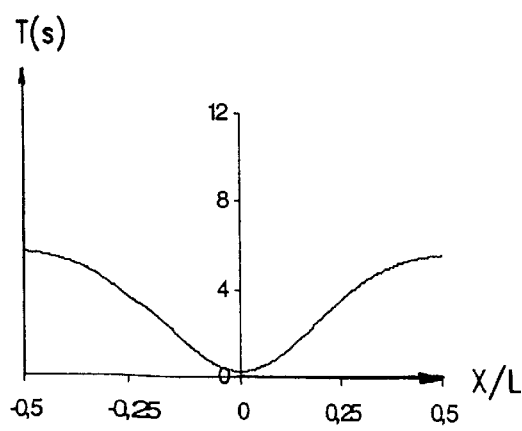
FIG. 11 shows a plot representing exposure time modulation along a guide in accordance with the invention.

The FIG. 11 plot therefore represents the time of passage of the beam as a function of the position on the guide during the second step. The curve has an inverted Gaussian shape. In other words, the ends of the guide are exposed for longer than the central parts of the guide. The second pass therefore increases the refractive index in a manner that is accentuated at the ends of the guide.

After this continuous second exposure, the average index of the grating is again constant over the photowritten part.

Figure 12:
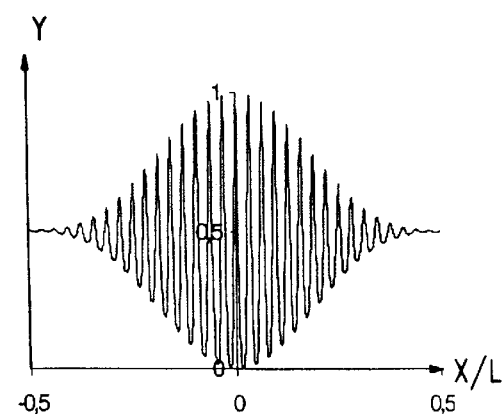
FIG. 12 shows a refractive index distribution along an optical guide after a second step of apodization according to the invention.

FIG. 12 shows the final index distribution after the two passes. The plot is a sinusoid oscillating between two envelopes which are symmetrical to each other about a horizontal straight line. The refractive index therefore varies about an average value which is the same all along the guide.

An optimum apodization curve is obtained in this way, the plot being further improved here by choosing a particular mathematical function for the index distribution, as will now be described.

For the first apodization step, the following standard formulas are adapted for a distribution of the fluence Y. In the following formulas, X is the longitudinal position of the beam along the guide, with X=0 at the center of the guide, and L is the photowritten length:

Gauss formula: $Y = A \cdot \exp[-G(X/L)^2]$ with $G=15$,

Hamming formula: $Y = A \cdot (1 + H \cos[(2\pi X/L)/1 + H]$ with $H=0.55$,

Blackman formula: $Y = [1 + (1+B)\cos(2\pi X/L) + B \cos(4\pi X/L)]/(2+2B)$ with $B=0.18$.

We propose to use the following formula:

$$Y_1 = A \cdot \cos^4(M \cdot X/L) \text{ with } M=2.78.$$

This law can be used to apodize the refractive index modulation of the grating along the planar guide with very great flexibility and with a very accurate modulation envelope shape.

In the above formula, $Y_1$ is the exposure time and A is the power of the UV laser (244 nm). The constant M optimizes the apodization envelope.

A distribution of the fluence $Y_2$ is applied in the second exposure step. The fluence is given by the following formula:

[laser power].[time]/[unit surface area]

(this is the solution proposed for fibers), or in this example by the exposure time.

$$Y_2(X) = (Y_0 - Y_1(X))/2$$

In the above formula, $Y_0$ is the value of $Y_1$ at abscissa 0, i.e. the maximum value of $Y_1$ along the guide.

The coincidence of positioning between the two passes is accurate to within one step (i.e. to within an accuracy of 1 μm in the case of the motor used here).

The curves of time=f(position) are programmed into the PC-type computer. The time unit is that of the PC clock. In a preferred embodiment of the invention the control system proposes a menu with the following choices, which makes the method very flexible:

formula used (Blackman, Gauss, etc), coefficient applied, photowriting length, and displacement pitch.

During photowriting, a display shows the theoretical "time=f(position)" curve and the curve actually achieved.

The facility to adjust the power of the laser is advantageously provided, together with the possibility of adding an offset to the pre-established curves.

In the apodization example just given, the guide is a straight silica-on-silicon guide. The apodization method described here applies to all silica-on-silicon components or fiber components which use a photowritten Bragg grating.

A system will now be described that forms an optical guide that is particularly well adapted to be photowritten by the method just described.

In particular, the invention enables photowriting of a Bragg grating of the above kind on a silica-on-silicon waveguide that is of the same quality as that obtained on an optical fiber, in particular providing a spectral width less than 0.8 nm.

The inventors have found that photowriting on a silica-on-silicon guide encounters the problem of unwanted reflection of the ultraviolet writing beam at a diopter that is formed by the junction between an optically conductive silica layer and the silicon base, in contrast to what happens on a fiber, and in particular in the case of Bragg gratings.

A reflected beam is superimposed on the incident beam inside the guide. The reflected beam is not under control and interferes with direct writing to the point of making it practically ineffective.

Figure 13:
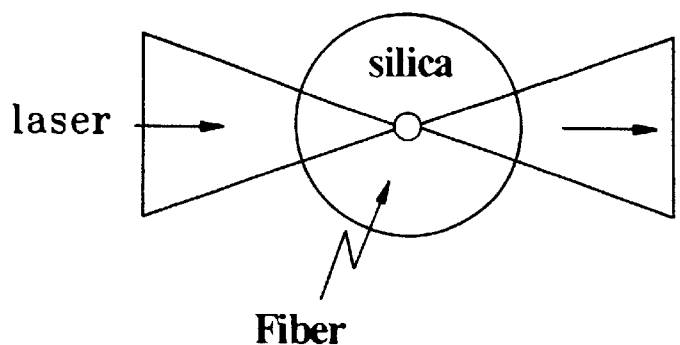
FIG. 13 shows a cross section of an optical fiber during exposure in accordance with the prior art.

In the case of photowriting on fiber, and as shown in FIG. 13, the UV laser beam passes through the optical cladding, which is insensitive to the radiation, and photowrites a Bragg grating, for example, in the photosensitive core of the fiber. In this particular case, the beam continues its path after photowriting and exits the fiber.

Figure 14:
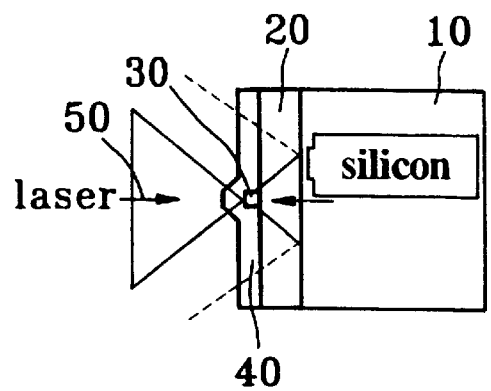
FIG. 14 shows a cross section of an optical guide during exposure in accordance with the prior art.
Figure 17:
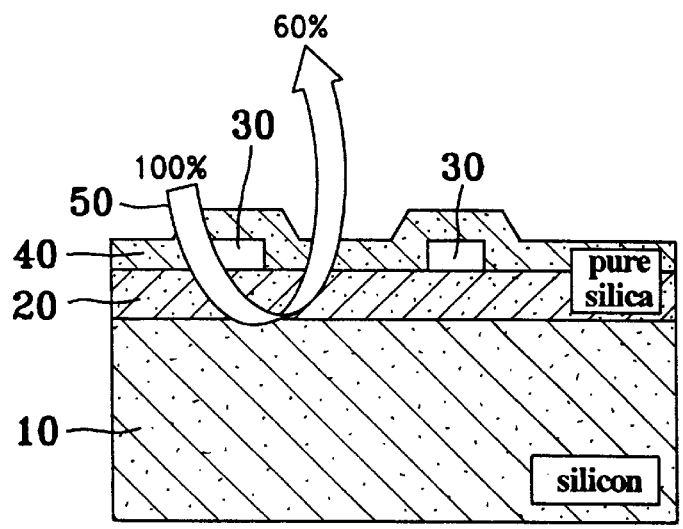
FIG. 17 shows a cross section of a system forming a prior art optical guide.

As shown in FIGS. 14 and 17, a system forming a silica-on-silicon (Si/SiO$_2$) optical guide usually includes a silicon base or platform on which is first deposited a layer 20 of pure silica referred to as the "cladding layer", followed by optical guides 30 on the cladding layer 20 and consisting of silica doped with germanium. The guides 30 and the layer 20 are covered with a pure silica layer 40.

The UV beam 50 incident on a planar Si/SiO$_2$ guide passes through the covering layer 40, which is insensitive to the radiation, and photowrites the core 30 with an index pattern. After writing, the UV beam 50 passes through the silica deposit 20 and is reflected at the Si/SiO$_2$ diopter formed between the cladding layer 20 and the base 10, with a reflection ratio close to 60% at a wavelength of 244 nm.

The reflected beam photowrites the core 30 again, but with optogeometrical characteristics different from those of the incident beam.

In the case of an optical fiber, the incident beam spatially modulated by interference writes a Bragg grating that typically reflects λB with a spectral width less than 0.8 nm and an amplitude greater than 35 dB (these values are given by way of example only).

In the system described here, the reflected UV beam also writes a Bragg grating which is superposed on the required incident grating, but because the Si/SiO$_2$ diopter is not a perfect mirror the two gratings formed by the incident and reflected beams have respective lengths λBi and λBr which are different from each other. The inventors have found that these two wavelengths typically have a difference ΔλB equal to 0.25 nm.

Figure 16:
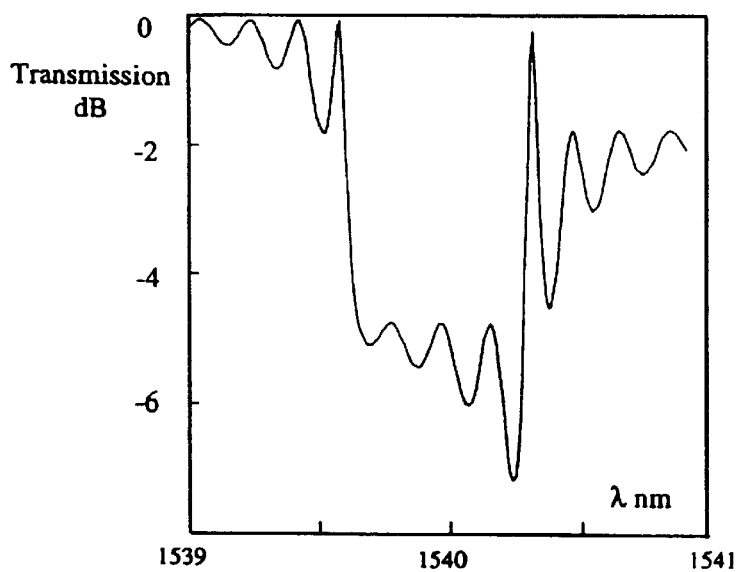
FIG. 16 shows a plot representing the spectral response of a prior art optical guide.

FIG. 16 shows a transmission spectrum of a grating obtained by the usual technique. The spectrum features an unusable reflection peak of low amplitude (6 dB) and large spectral width. It is therefore necessary to eliminate the beam reflected by the Si/SiO$_2$ diopter.

Figure 18:
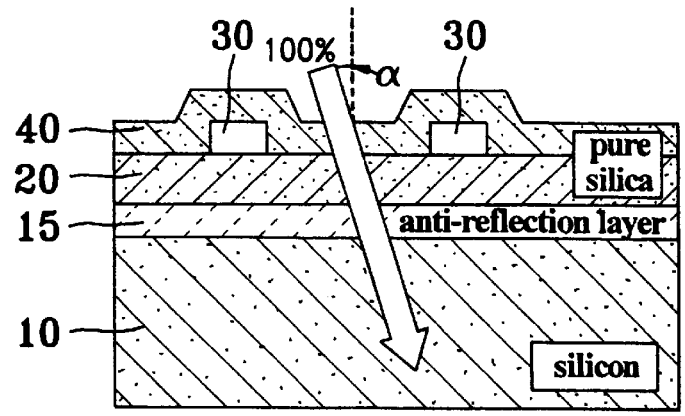
FIG. 18 shows a cross section of a system forming an optical guide according to the invention.

FIG. 18 shows a system forming an optical guide constituting one embodiment of the invention.

The above system uses the same components described previously with reference to the prior art systems shown in FIGS. 14 and 17, and further includes an intermediate layer 15 between the silicon layer 10 and the guides 30.

To be more precise, the layer 15 is between the pure silica cladding layer 20 and the layer 10.

The function of the layer 15 is to transmit through the silicon layer 10 incident light penetrating through the layers from the top face of the system. The layer 15 has an anti-reflection function with respect to the incident beam 50. As in the prior art systems described before, this system is produced by a series of successive deposition operations.

It is known that silicon absorbs UV radiation and in particular UV radiation at the wavelength of 244 nm used here. For all of the incident radiation 50 to be absorbed by the silicon layer 10 the layer 15 must transmit all of the radiation.

The anti-reflection layer 15 is produced during the production of the system by a vacuum deposition technique independent of the silica deposition process. The inventors have identified particularly effective materials for this and particular thicknesses of the layer 15 especially suited to that choice of materials. The refractive index of the layer 15 is therefore preferably close to the square root of the product of the indices of the two layers on either side of it and with which it is in contact.

In this example, the index N(anti-reflection) of the layer 15 is given by the formula:

$$N(\text{anti-reflection})= \tag{1}$$

For a given angle a of incidence of the incident beam, the thickness Ep of the layer 15 is advantageously:

$$Ep=(2k+1)\lambda/4N_{AR}\cos\alpha \tag{2}$$

In the above equation, $N_{AR}$ is the refractive index of the layer 15, $\lambda$ is the wavelength of the incident beam and k is any integer.

The refractive indices of silica and silicon, which are known for visible light, are calculated for the wavelength of 244 nm by extrapolation from the Cauchy formula, and materials found to satisfy the index criterion of equation 1 include SiO, $Si_3N_4$ and $TiO_2$, for example.

In this example, the thickness is chosen for k=1 and $\alpha$=13° in equation (2).

In a method of photowriting using an interference system, such as the phase mask 140 used in this example, two incident beams having inclinations $\alpha$ and $-\alpha$ of 13° relative to the normal to the face of the system are obtained at the output of the interference system, at the level of the upper surface of the coating layer 40, and for each interference fringe.

Particularly low residual reflection, of the order of 4%, is achieved and would seem to consist only of reflection due to another diopter formed by an entry surface between air and the covering silica layer 40. The transmission coefficient of the anti-reflection layer 15 is therefore very close to 1.

Figure 15:
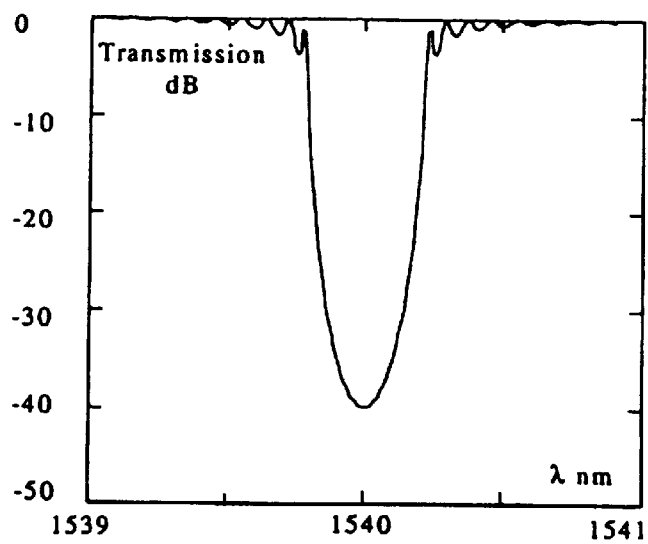
FIG. 15 shows a plot representing the spectral response of an optical guide according to the invention.

FIG. 15 shows that the reflection spectrum obtained has a spectral length of 0.5 nm and an amplitude of 40 dB. Under these conditions photowriting is therefore free of the unwanted and uncontrolled effect of the reflected beam and provides the fiber quality previously achieved.

[1] B. MALO et al, El. Letters, V31, p.223 (1995) (CRC, Ottawa)
   First pass without phase mask through a variable density (cos 2) mask followed by second pass with a phase mask through the complementary mask.

[2] J. ALBERT et al, El. Letters, V31, N°3, p.222 (1995) (CRC, Ottawa)
   Photowriting using a phase mask having a non-constant (Gaussian) etch depth.

[3] M. J. COLE et al, El. Letters, V31, N°17, p.488 (1995) (University of Southampton) and Opt. Letters, V20, N°20, p.2051 (1995) (University of Southampton)
   Photowriting of gratings scrambled at the edges and in phase at the center by vibration of the fiber controlled by piezo-electric modules (Gaussian and Blackman form frequency amplitude).

[4] R. KASHIAP et al, El. Letters, V32, N°13, p.226 (1996) (British Telecom, Ipswich)
   Simultaneous photowriting of two gratings offset by one half-period at the edges and in phase at the center using two piezo-electric modules stretching the fiber at two discrete positions (result of the apodization of cosine form).

[5] M. GUY et al, ECO 97, p.195 (INO, Sainte Foy (Québec))
   Photowriting using a mirror mounted on a galvanometer disposed in front of the phase mask. Depending on its angle, the fringes are scrambled or superposed.

[6] K. E. CHISHOLM et al, ECOC 98, p.385 (University of Birmingham). Same as COLE and LOH with Gaussian and cosine form. Piezo-electric module on the phase mask.

[7] H. SINGH et al, ECOC 98, p.189 (3M Bragg Grating Technologies, Bloomfield USA)
   Splitting of the laser beam into two parts. The first passes through a filter having the required apodization profile and then the phase mask before exposing the fiber. The second part exposes the fiber from the opposite direction (without being diffracted by the mask) through a filter having a profile that is the inverse of the first profile, with the aim of obtaining a constant average index).

[8] P. MERCIER et al, JNOG 98, p.359 (Alcatel, Marcoussis) Blackman form apodization.

[9] P. Y. CORTES et al, El. Letters, V34, N°4, p.396 (1998) (Universite Laval Québec) An interferometer system is disposed behind the fiber and the phase mask with the aim of creating a Gaussian amplitude fringe grating.

[10] H. G. FRÖHLICH and R. KASHYAP, Opt Com, V157, p.273 (December 1998) (BT, Ipswich)
   Two methods using a "Young's slots" type interference system (without phase mask):
   Using incoherent (polychromatic) light at wavelengths close to 244 nm. The interference fringes then have a Gaussian envelope.
   Using coherent light. After a first photowriting, a silica wedge is placed on one of the beams which introduces a step and position difference which creates interference fringes which are superposed on the first ones to give a final Gaussian envelope modulation amplitude.

[11] L. QUETEL and L. RIVOALLAN (97 patent) (Highware Optical Technologies, Lannion) Variation of the UV exposure power by means of a mobile rotating blade of ad-hoc shape disposed on the path of the beam, which induces a Gaussian amplitude of the photowritten index modulation.

[12] V. MIZRAHI and J. E. SIPE (AT & T Bell labs and University Toronto) "Optical properties of photosensitive fiber phase gratings" Journal of lightwave technology, V11, N°10, p.1513, 1993 (Modeling-experimental comparison of Fabry-Perot effect and cladding mode).

[13] D. PASTOR et al (ETSI telecommunication, Valencia) "Design of apodized linearly chirped fiber gratings for dispersion compensation" Journal of lightwave technology, V.14, N°11, p.1513, 1996 (Theoretical comparison of different apodization functions).

[14] J. CANNING et al (APCRC, New South Wales (Australia)) "Characterization of apodized fiber Bragg gratings for rejection filter applications" Applied Optics, V36, N°36, p.9378, 1997 (Precise measurement of the indices of apodized Bragg gratings by Rayleigh backscattering).

What is claimed is:

1. An exposure method for producing a grating on a photosensitive guide or optical fiber, in which method the guide (the fiber) is scanned by a light beam and modulating means are provided for modulating the exposure time along the guide (the fiber) by varying the speed at which the beam moves along the guide (the fiber) so that the beam is located opposite each location of the guide (the fiber) for a time period that varies with the location, the method including the step of disposing in front of the guide (the fiber) an interference system adapted to create interference fringes on the guide (the fiber) and to scan the beam over the interference system at a speed that is modulated along the interference system, and furthermore the step of having the beam scan the guide (the fiber) at a modulated speed without the interference system on the path of the beam, the scanning with the interference system being effected with modulation of the exposure time increasing the exposure time in the central part of the guide (the fiber) and the scanning without the interference system being effected with modulation of the exposure time reducing the exposure time in the central part of the guide (the fiber), wherein the method is carried out on a system forming an optical guide comprising a part consisting of a material whose refractive index changes when it is exposed to an ultra-violet beam and a part forming the base for the part which is sensitive to ultra-violet light, and in that the system includes an anti-reflection system between the photosensitive part and the base.

2. A method according to claim 1, wherein the photosensitive part is made of silica and the base is made of silicon.

3. A method according to claim 1, wherein the anti-reflection system consists of a layer having a refractive index ($N_{AR}$) close to the square root of the product of the refractive indices of the two layers on either side of any in contact with the anti-reflection layer.

4. A method according to claim 2, wherein the anti-reflection system consists of a layer between and in contact with a silica layer and a silicon layer.

5. A method according to claim 1, wherein the system employs refractive index modulation along the guide so that said system forms a Bragg grating.

6. A method according to claim 1, wherein the anti-reflection system is made from a material chosen from materials with compatible refractive indices.

7. A method according to claim 1, wherein the guide is exposed using at least one beam having a wavelength $\lambda$ and an angle $\alpha$ of incidence on an upper face of the system, $\alpha$ being measured relative to the normal to that face, and in that an anti-reflection layer is disposed between the photosensitive part and the base whose thickness is made substantially equal to an odd number of times the value $\lambda/4N \cos \alpha$ where N is the refractive index of the anti-reflection layer.

8. A method according to claim 1, wherein the thickness of the anti-reflection layer is made substantially equal to $3\lambda/4N \cos \alpha$.

9. A method according to claim 7, wherein angles $\alpha$ of inclination for said at least one beam are chosen substantially equal to 13°.

10. An exposure method for producing a Bragg grating on a photosensitive guide, in which method the guide is scanned by a light beam and modulating means are provided for modulating the exposure time along the guide by varying the speed at which the beam moves along the guide so that the beam is located opposite each location of the guide for a time period that varies with the location, the method including the step of disposing in front of the guide an interference system adapted to create interference fringes on the guide and to scan the beam over the interference system at a speed that is modulated along the interference system, and furthermore the step of having the beam scan the guide at a modulated speed without the interference system on the path of the beam, the scanning with the interference system being effected with modulation of the exposure time increasing the exposure time in the central part of the guide and the scanning without the interference system being effected with modulation of the exposure time reducing the exposure time in the central part of the guide, the method being carried out on a system forming an optical guide comprising a part consisting of a material whose refractive index changes when it is exposed to an ultra-violet beam and a part forming the base for the part which is sensitive to ultra-violet light, the system including an anti-reflection system between the photosensitive part and the base.

11. A method according to claim 10, wherein the photosensitive part is made of silica and the base is made of silicon.

12. A method according to claim 10, wherein the anti-reflection system consists of a layer having a refractive index ($N_{AR}$) close to the square root of the product of the refractive indices of the two layers on either side of any in contact with the anti-reflection layer.

13. A method according to claim 11, wherein the anti-reflection system consists of a layer between and in contact with a silica layer and a silicon layer.

14. A method according to claim 10, wherein the system employs refractive index modulation along the guide so that said system forms a Bragg grating.

15. A method according to claim 10, wherein the anti-reflection system is made from a material chosen from materials with compatible refractive indices.

* * * * *